United States Patent
Funakawa

(10) Patent No.: US 10,379,792 B2
(45) Date of Patent: Aug. 13, 2019

(54) OPERATION DISPLAY APPARATUS, INFORMATION APPARATUS, AND RECORDING MEDIUM

(71) Applicant: KONICA MINOLTA, INC., Chiyoda-ku, Tokyo (JP)

(72) Inventor: Hisataka Funakawa, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/882,995

(22) Filed: Jan. 29, 2018

(65) Prior Publication Data

US 2018/0246686 A1    Aug. 30, 2018

(30) Foreign Application Priority Data

Feb. 24, 2017   (JP) .................................. 2017-033055

(51) Int. Cl.
| | |
|---|---|
| *H04N 1/04* | (2006.01) |
| *G06F 3/12* | (2006.01) |
| *H04N 1/00* | (2006.01) |
| *G06F 1/32* | (2019.01) |

(52) U.S. Cl.
CPC .............. *G06F 3/1221* (2013.01); *G06F 1/32* (2013.01); *G06F 3/1229* (2013.01); *G06F 3/1288* (2013.01); *H04N 1/00413* (2013.01); *H04N 1/00474* (2013.01); *H04N 1/00477* (2013.01); *H04N 1/00891* (2013.01); *H04N 2201/0094* (2013.01)

(58) Field of Classification Search
CPC .......... H04N 1/00891; H04N 1/00413; H04N 1/00474; H04N 1/00477; H04N 2201/0094
USPC ..................................................... 358/1.15
See application file for complete search history.

(56) References Cited

U.S. PATENT DOCUMENTS

| | | | | |
|---|---|---|---|---|
| 7,302,195 B2 * | 11/2007 | Kobayashi | ............ | G06F 1/3203 399/8 |
| 2011/0228328 A1 * | 9/2011 | Sugimoto | ............... | G06F 9/542 358/1.15 |

(Continued)

FOREIGN PATENT DOCUMENTS

| | | |
|---|---|---|
| JP | 2006121206 A | 5/2006 |
| JP | 2010034749 A | 2/2010 |

*Primary Examiner* — Houshang Safaipour
(74) *Attorney, Agent, or Firm* — Holtz, Holtz & Volek PC

(57) ABSTRACT

An operation display apparatus for shared use between a first and a second apparatus each being capable of operating independently, the operation display apparatus including a display, a manipulation device, and a processor, wherein the processor performs: allowing the display to selectively show either of display data received from the first apparatus through a first display interface and display data received from the second apparatus through a second display interface; transmitting operation information of an operation on the manipulation device to the first apparatus through a first input-output interface and to the second apparatus through a second input-output interface; detecting through the first or second display interface whether at least either one of the first and second apparatus enters power saving mode; and prohibiting the transmission of operation information to the first or second apparatus when at least either one of the first and second apparatus enters power saving mode.

25 Claims, 7 Drawing Sheets

(56) References Cited

U.S. PATENT DOCUMENTS

2014/0376033 A1* 12/2014 Tokishige .......... G03G 15/5004
358/1.14
2017/0289314 A1* 10/2017 Nakamura ............ H04L 67/142

* cited by examiner

| Component | Assigned To | Remark |
|---|---|---|
| Touch Screen Panel | Server/MFP | Depending on the currently displayed screen |
| Hardware Key 321 | MFP | |
| Hardware Key 322 | MFP | |
| Hardware Key 323 | Server | |
| Proximity Sensor 324 | MFP | |

OPERATION DISPLAY APPARATUS, INFORMATION APPARATUS, AND RECORDING MEDIUM

The disclosure of Japanese Patent Application No. 2017-033055 filed on Feb. 24, 2017, including description, claims, drawings, and abstract, is incorporated herein by reference in its entirety.

BACKGROUND

Technological Field

The present invention relates to: an operation display apparatus for shared use among multiple apparatuses each being capable of operating independently such as a server and a multi-function peripheral (MFP) i.e. multifunctional digital machine; an information apparatus provided with this operation display apparatus; and a recording medium.

Description of the Related Art

It is common that, in addition to MFPs mainly for copying and printing, many information processing apparatuses for electronic data processing, such as servers, are also used in workplaces; it is also common that such an information processing apparatus and such an MFP are used together for composite processing.

Furthermore, to achieve lower power consumption, it is common that such an MFP and an information processing apparatus are configured to cause a blank screen on their operation display apparatuses and enter power saving mode after a certain period of inactivity and resume normal operation from power saving mode by receiving operation information of an operation on their operation display apparatuses.

To simplify the management and maintenance of apparatuses in an entire workplace, multiple apparatuses each capable of operating independently, such as MFPs and information processing apparatuses, can be consolidated into one cabinet. This is a composite apparatus provided with one composite operation display apparatus for shared use among the multiple apparatuses such that the composite operation display apparatus selectively displays either an operation screen of an apparatus or an operation screen of another apparatus. To achieve lower power consumption, the composite apparatus can be configured to enter power saving mode after a certain period of inactivity as the conventional apparatuses are; this configuration, however, has a problem as described below.

The composite apparatus, which is provided with the composite operation display apparatus for shared use among the multiple apparatuses, transmits operation information of an operation on the composite operation display apparatus to all the multiple apparatuses. When the user manipulates the composite operation display apparatus to use an apparatus not operating in power saving mode, the composite apparatus transmits operation information to all the multiple apparatuses including an apparatus operating in power saving mode. Receiving operation information, the apparatus operating in power saving mode will be uselessly restored to normal operating mode, only to waste the feature of lower power consumption.

Japanese Unexamined Patent Application Publication No. 2010-034749 suggests a processing apparatus that allows the user to change the operating mode to which the processing apparatus should be restored from power saving mode.

Japanese Unexamined Patent Application Publication No. 2006-121206 suggests a power supply control apparatus that is capable of achieving lower power consumption by cutting off power supply to the modules to be unused for the user's desired process.

The techniques described in these publications are techniques for an apparatus to achieve the lower power consumption of the apparatus itself. These techniques do not solve the problem of one composite operation display apparatus for shared use among multiple apparatuses: an apparatus operating in power saving mode will be uselessly restored to normal operating mode when the user manipulates the composite operation display apparatus to use an apparatus not operating in power saving mode.

SUMMARY

The present invention, which has been made in consideration of such a technical background as described above, is capable of preventing from uselessly restoring an apparatus operating in power saving mode to normal when the user manipulates the composite operation display apparatus to use an apparatus not operating in power saving mode.

A first aspect of the present invention relates to an operation display apparatus for shared use between a first apparatus and a second apparatus each being capable of operating independently, the operation display apparatus including a display, a manipulation device, and a processor, wherein the processor performs the following operations:

allowing the display to selectively show either of the following: display data received from the first apparatus through a first display interface and display data received from the second apparatus through a second display interface;

transmitting operation information of an operation on the manipulation device to the first apparatus through a first input-output interface and to the second apparatus through a second input-output interface;

detecting through the first or second display interface whether at least either one of the first and second apparatus enters power saving mode; and prohibiting the transmission of operation information to the first apparatus that enters power saving mode through the first input-output interface or prohibiting the transmission of operation information to the second apparatus that enters power saving mode through the second input-output interface, when at least either one of the first and second apparatus enters power saving mode is detected.

A second aspect of the present invention relates to a non-transitory computer-readable recording medium storing a program for an operation display apparatus comprising a display and a manipulation device, the operation display apparatus for shared use between a first apparatus and a second apparatus each being capable of operating independently, the program to make a computer of the operation display apparatus execute:

allowing the display to selectively show either of the following: display data received from the first apparatus through a first display interface and display data received from the second apparatus through a second display interface;

transmitting operation information of an operation on the manipulation device to the first apparatus through a first input-output interface and to the second apparatus through a second input-output interface;

detecting through the first or second display interface whether at least either one of the first and second apparatus enters power saving mode; and prohibiting the transmission of operation information to the first apparatus that enters power saving mode through the first input-output interface or prohibiting the transmission of operation information to the second apparatus that enters power saving mode through the second input-output interface, when at least either one of the first and second apparatus enters power saving mode is detected.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
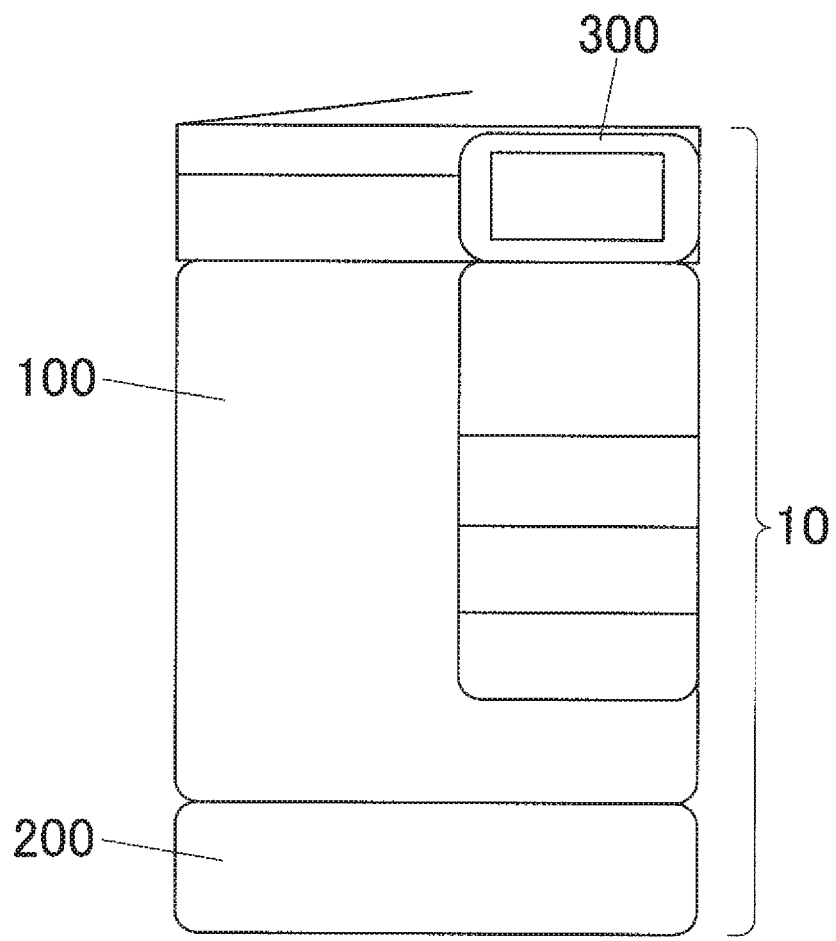
FIG. 1 illustrates a front view of an information apparatus according to one embodiment of the present invention.

FIG. 1 illustrates a front view of an information apparatus 10 according to one embodiment of the present invention. This information apparatus 10 is one cabinet housing multiple apparatuses each capable of operating independently. In this embodiment, the multiple apparatuses consist of an image forming apparatus 100 and a server 200.

As illustrated in FIG. 1, the information apparatus 10 is one cabinet housing the image processing apparatus 100 and the server 200; the image processing apparatus 100 is located in the upper section of the cabinet and the server 200 is located in the lower section of the cabinet. The information apparatus 10 has one operation display apparatus 300 for shared use between the image processing apparatus 100 and the server 200.

The information apparatus 10 is not necessarily one cabinet housing the image processing apparatus 100 and the server 200; alternatively, the information apparatus 10 may be a combination of the image processing apparatus 100 and the server 200 that are simply located adjacent to each other.

In this embodiment, a multi-function peripheral (MFP) i.e. a multifunctional digital image forming apparatus having various functions such as a copier function, a printer function, a scanner function, and a facsimile function are employed as the image processing apparatus 100. Hereinafter, the image processing apparatus 100 will also be referred to as the MFP 100. The server 200 is comprised of a personal computer.

Figure 2:
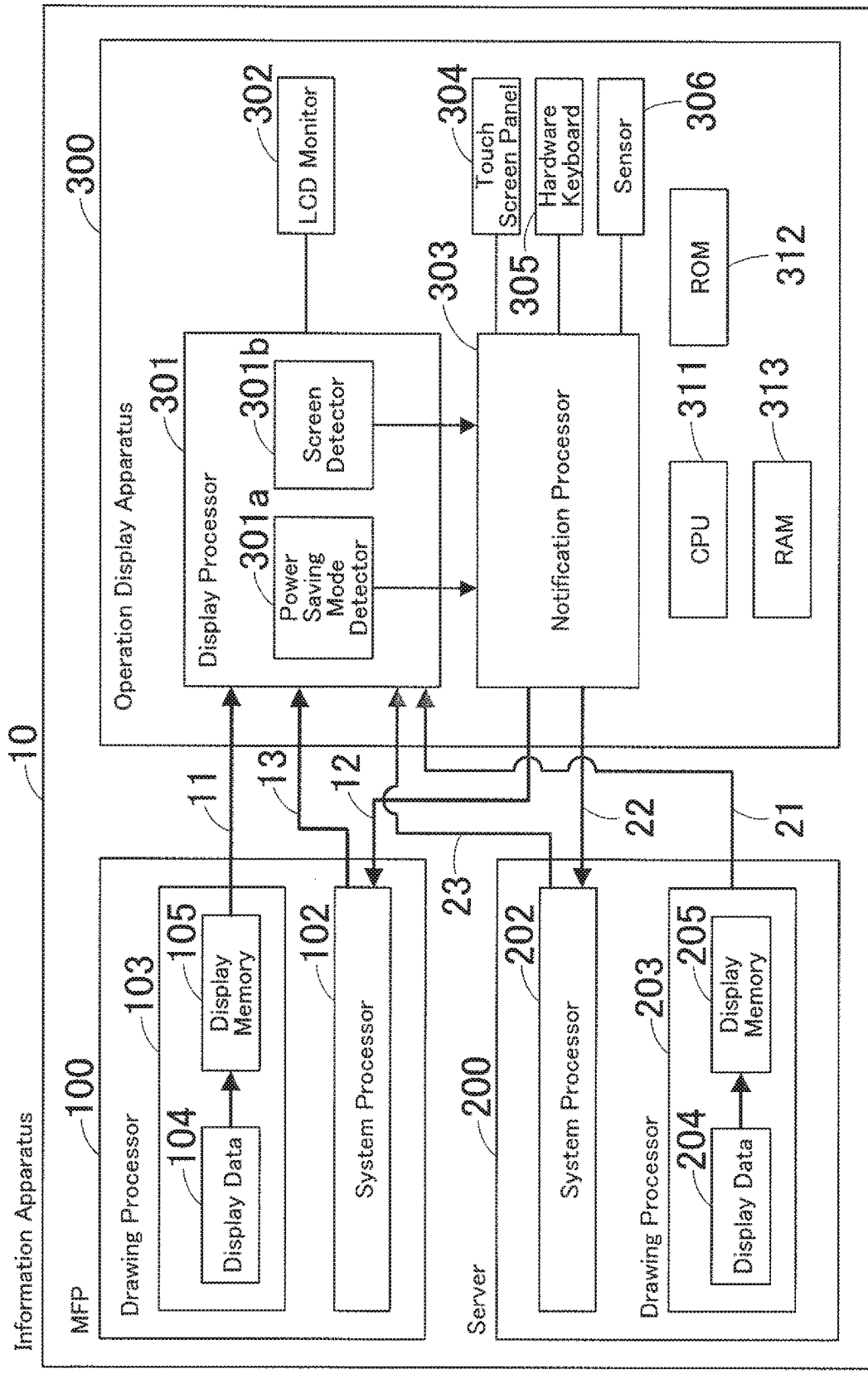
FIG. 2 is a block diagram illustrating an internal configuration of the information apparatus.

FIG. 2 is a block diagram illustrating an internal configuration of the information apparatus 10.

The MFP 100 operates independently and is provided with a system processor 102 and a drawing processor 103. The system processor 102 controls the MFP 100 in a unified and systematic manner and is essentially provided with a CPU, a ROM, and a RAM that are not shown in the figure. Under the control of the system processor 102, the MFP 100 receives user activities and executes its copier function, printer function, scanner function, and other functions.

The drawing processor 103 is provided with a display memory 105 for storing display data 104, which is a memory referred to as VRAM. The drawing processor 103 requests an operation display apparatus 300 to show the display data 104 stored on the display memory 105 by transferring the same to the operation display apparatus 300. The drawing processor 103 creates the display data 104 by combining many display elements stored on the MFP 100, such as operation buttons and messages, and stores the same on the display memory 105. The drawing processor 103 also updates the content of the display memory 105 as the need arises.

The MFP 100 is essentially provided with, in addition to the system processor 102 and the drawing processor 103, a scanner, an imaging device, a storage device such as a hard disk drive, and a communication interface for communicating with external apparatuses, which are omitted from FIG. 2.

Similarly, the server 200 operates independently and is provided with a system processor 202 and a drawing processor 203. The system processor 202 controls the server 200 in a unified and systematic manner and is essentially provided with a CPU, a ROM, and a RAM that are not shown in the figure. Under the control of the system processor 202, the server 200 receives user activities and executes processing in accordance with the user activities.

The system processor 202 of the server 200 and the system processor 102 of the MFP 100 are connected to each other through a network or a predetermined interface and are thus capable of communicating with each other.

The drawing processor 203 is provided with a display memory 205 for storing display data 204. The drawing processor 203 requests the operation display apparatus 300 to show the display data 204 stored on the display memory 205 by transferring the same to the operation display apparatus 300. The drawing processor 203 creates the display data 204 by combining many display elements stored on the server 200, such as operation buttons and messages, and stores the same on the display memory 205. The drawing processor 203 also updates the content of the display memory 205 as the need arises.

The server 200 is essentially provided with, in addition to the system processor 202 and the drawing processor 203, a storage device such as a hard disk drive and a communication interface for communicating with external apparatuses, which are omitted from FIG. 2.

The operation display apparatus 300 is essentially provided with a display processor 301, an LCD monitor 302, a notification processor 303, a touch screen panel 304, a hardware keyboard 305, and a sensor 306.

The display processor 301 allows the LCD monitor 302 to selectively show either of the following: display data received from the drawing processor 103 of the MFP 100 through a first display interface 11; and display data received from the drawing processor 203 of the server 200 through a second display interface 21. Specifically, the display processor 301 causes the LCD monitor 302 to show display data of the MFP 100 upon receiving a display requesting signal 13 from the system processor 102 of the MFP 100; similarly, the display processor 301 causes the LCD monitor 302 to show display data of the server 200 upon receiving a display requesting signal 23 from the system processor 202 of the server 200. The display processor 301 may receive the display requesting signal 13 and 23 simultaneously; in this case, the display processor 301 shows either of the display data objects in accordance with the predetermined priority.

The display processor 301 is provided with a power saving mode detector 301a and a screen detector 301b as its functions. The power saving mode detector 301a detects through the first display interface 11 when the MFP 100 enters power saving mode; similarly, the power saving mode detector 301a detects through the second display interface 21 when the server 200 enters power saving mode. The detection method will be later described in detail.

The screen detector 301b has a function of detecting information on a screen displayed on the LCD monitor 302. Specifically, the screen detector 301b judges whether or not the screen displayed on the LCD monitor 302 is an operation screen of the MFP 100. If it is an operation screen of the server 200, the screen detector 301b then judges whether or not the display area of the LCD monitor 302 includes a restoration area for restoring the MFP 100 to normal from power saving mode.

The LCD monitor 302 displays the display data 104 of the MFP 100 and the display data 204 of the server 200, and is comprised of a liquid-crystal display (LCD). The LCD monitor 302 displays the display data 104 while receiving driving clock signal from the drawing processor 103 of the MFP 100 through the first display interface 11; the LCD monitor 302 displays the display data 204 while receiving driving clock signal from the drawing processor 203 of the server 200 through the second display interface 21. The LCD monitor 302 is provided with an illuminator (backlight) not shown in the figure. This illuminator is turned on and off by illumination signal received from the drawing processor 103 of the MFP 100 through the first display interface 11; similarly, the illuminator is turned on and off by illumination signal received from the drawing processor 203 of the server 200 through the second display interface 21.

When the MFP 100 enters power saving mode, the drawing processor 103 of the MFP 100 stops sending driving clock signal to the LCD monitor 302 through the first display interface 11 but instead, the drawing processor 103 of the MFP 100 sends illumination "off" signal to the LCD monitor 302 through the first display interface 11; and the illuminator will be turned off thereby. Similarly, when the server 200 enters power saving mode, the drawing processor 203 of the server 200 stops sending driving clock signal to the LCD monitor 302 through the second display interface 21 but instead, the drawing processor 203 of the server 200 sends illumination "off" signal to the LCD monitor 302 through the second display interface 21; and the illuminator will be turned off thereby.

The power saving mode detector 301a monitors the first display interface 11 and the second display interface 21. The power saving mode detector 301a judges that the MFP 100 enters power saving mode by losing driving clock signal from the first display interface 11 or by detecting the off state of illumination signal from the first display interface 11; similarly, the power saving mode detector 301a judges that the server 200 enters power saving mode by losing driving clock signal from the second display interface 21 or by detecting the off state of illumination signal from the second display interface 21.

Alternatively, the power saving mode detector 301a may judge that the MFP 100 enters power saving mode by detecting the change of power saving signal from the first display interface 11; similarly, the power saving mode detector 301a may judge that the server 200 enters power saving mode by detecting the change of power saving signal from the second display interface 21.

The notification processor 303 has a function of transmitting operation information to the system processor 102 of the MFP 100 through a first input-output interface 12 and to the system processor 202 of the server 200 through a second input-output interface 22, when the user manipulates the touch screen panel 304 and the hardware keyboard 302. The notification processor 303 performs the following operations: judging whether or not to prohibit the transmission of operation information to the MFP 100 when the MFP 100 enters power saving mode; prohibiting the transmission of operation information; and removing the prohibition on the transmission; similarly, the notification processor 303 performs the following operations: judging whether or not to prohibit the transmission of operation information to the server 200 when the server 200 enters power saving model; prohibiting the transmission of operation information; and removing the prohibition on the transmission. These operations will be later described in detail.

The touch screen panel 304 functions as a manipulation device and is layered on the surface of the LCD monitor 302. When the user touches a screen on the touch screen panel 304, the notification processor 303 transmits operation information, including the coordinates of the touch event, to the MFP 100 or the server 200. The MFP 100 and the server 200 are capable of executing processing in accordance with the operation information and requesting the display processor 301 to show display data stored on the display memory 105 or the display memory 205 by transferring the same to the display processor 301.

The hardware keyboard 305 has hardware keys such as a start key, a reset key, and a stop key. The sensor 306 has one or more sensors, which are proximity sensors, for example.

In this embodiment, the display processor 301 and the notification processor 303 are configured as if they are some of the functions of the CPU 311. The CPU 311 performs the operations of the display processor 301 and the notification processor 303 by running operation programs stored on the ROM 312. The RAM 313 is a memory that provides a workspace for the CPU 311 to perform processing in accordance with the operation programs.

Hereinafter, operations of the information apparatus 10 illustrated in FIGS. 1 and 2 will be described.

Figure 3:
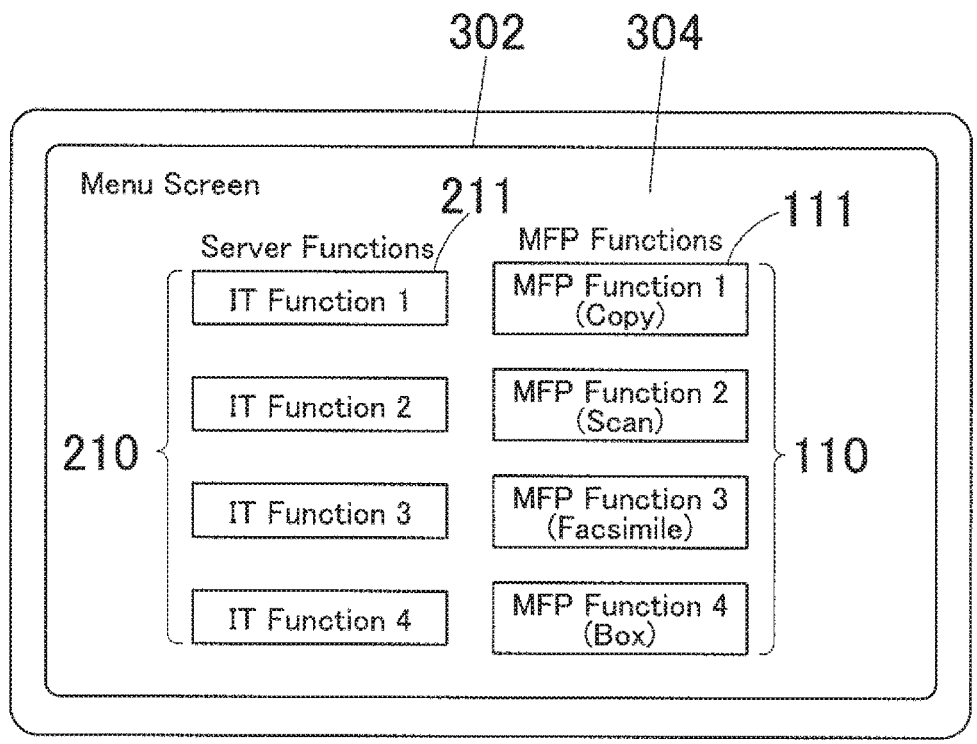
FIG. 3 illustrates an initial menu screen to be displayed on a display.

FIG. 3 illustrates an initial menu screen to be displayed on the LCD monitor 302 of the operation display apparatus 300 when the information apparatus 10 is not operating in power saving mode (when it is operating in normal operating mode). The initial menu screen is a screen based on display data created by the server 200 in this embodiment. In this initial menu screen, function buttons each corresponding to a user-accessible function of the server 200 and the MFP 100 are shown. In the "Server Functions" column in this screen, listed are the function buttons titled "IT Function 1", "IT Function 2", "IT Function 3", and "IT Function 4"; and these function buttons belong to a function button group 210 for executing the functions of the server 200. In the "MFP Functions" column, listed are the function buttons titled "MFP Function 1 (Copy)", "MFP Function 2 (Scan)", "MFP Function 3 (Facsimile)", and "MFP Function 4 (Box)"; and these function buttons belong to a function button group 110 for executing the following functions of the MFP 100: copier function, scanner function, facsimile function, and box function. Box function is a function that uses a memory area called "box", for example: the function of storing a scanned document in a box and the function of transferring a document from the box to outside.

When the MFP 100 is inaccessible e.g. when the MFP 100 is turned off the function button group 110 may be grayed out such that the function button group 110 is unavailable.

When the user touches any of the function buttons, the touch screen panel 304 detects the touch event. The notification processor 303 then transmits operation information of the touch event to the system processor 102 of the MFP 100 through the first input-output interface 12 and to the system processor 202 of the server 200 through the second input-output interface 22.

The operation information may indicate that the user touched any of the function buttons from the function button group 210 for executing the functions of the server 200. In this case, upon receiving the operation information, the server 200 creates display data of an operation screen for setting the function corresponding to the function button touched by the user, and requests the display processor 301 to show the display data. As requested, the display processor 301 causes the LCD monitor 302 to show the display data of the server 200. Specifically, if the operation information indicates that the user touched the button 211 titled "IT Function 1", the display processor 301 causes the LCD monitor 302 to show an operation screen for setting the IT function 1 as illustrated in FIG. 4.

The MFP 100 receives the operation information but does not start any operation because the initial menu screen shown in FIG. 3 is a screen created by the server 200, not by the MFP 100.

Figures 5, 6:
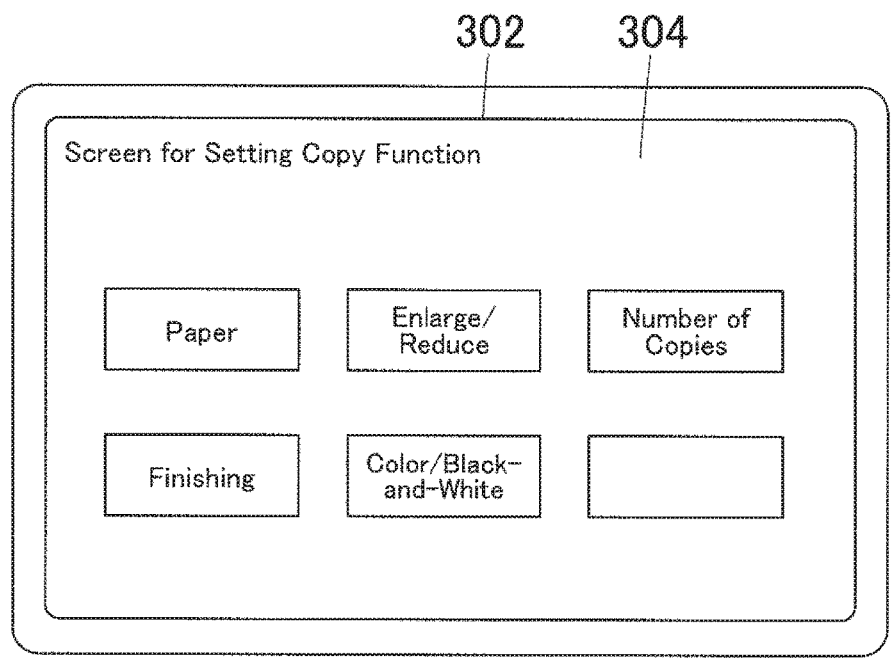
FIG. 5 illustrates an operation screen for setting the MFP function 1 (Copy), which is to be displayed upon the pressing of the button titled "MFP Function 1 (Copy) in the initial menu screen.
FIG. 6 is a view for reference in describing how to prohibit the transmission of operation information when at least either one of a first and second apparatus is operating in power saving mode.

Alternatively, the operation information may indicate that the user touched any of the function buttons from the function button group 110 for executing the functions of the MFP 100. In this case, upon receiving the operation information, the server 200 transfers it to the MFP 100 through the network or by another method. Upon receiving the operation information from the server 200, the MFP 100 creates display data of an operation screen for setting the function corresponding to the function button touched by the user, and requests the display processor 301 to show the display data. As requested, the display processor 301 causes the LCD monitor 302 to show the display data of the MFP 100. Specifically, if the operation information indicates that the user touched the button 11 titled "MFP Function 1 (Copy)", the display processor 301 causes the LCD monitor 302 to show an operation screen for setting copy function as illustrated in FIG. 5.

Figure 4:
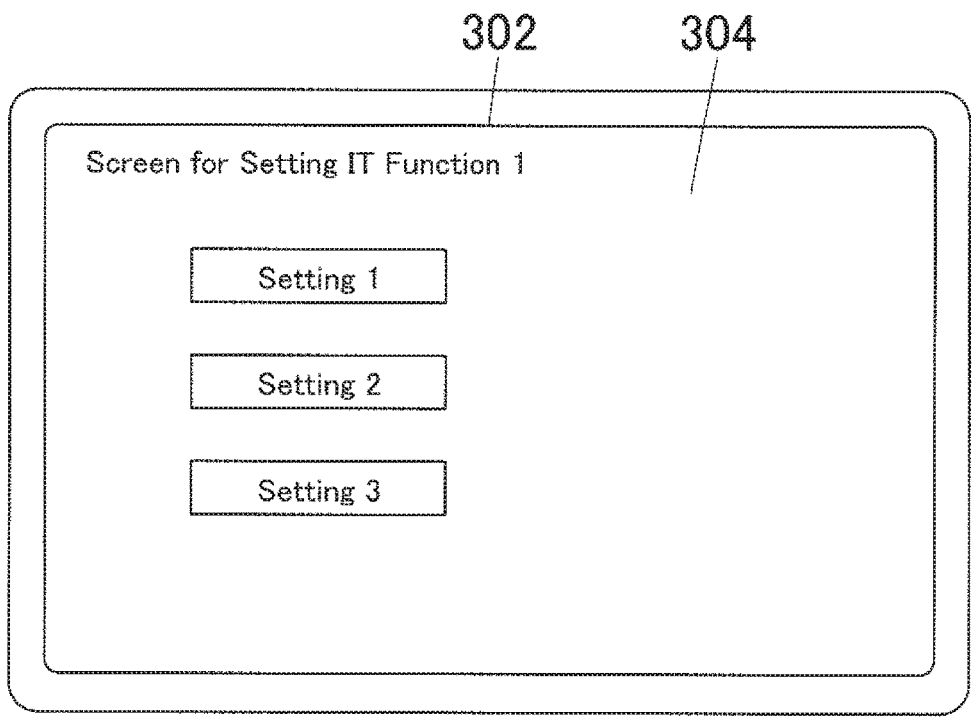
FIG. 4 illustrates an operation screen for setting the IT function 1, which is to be displayed upon the pressing of the button titled "IT Function 1" in the initial menu screen.

When the user touches a setting button on the operation screen shown in FIG. 4, the display processor 301 transmits operation information to the server 200. Receiving the operation information, the server 200 performs either of the following operations: executing processing accordingly; and creating display data of a screen to be shown next and requesting the display processor 301 to show the screen. When the user touches a setting button on the operation screen shown in FIG. 5, the display processor 301 transmits operation information to the MFP 100. Receiving the operation information, the MFP 100 performs either of the following operations: executing processing accordingly; and creating display data of a screen to be shown next and requesting the display processor 301 to show the screen.

When the user completes the manipulation, the display processor 301 causes the LCD display 302 to return to the initial menu screen shown in FIG. 3. The MFP 100 and the server 200 enter power saving mode (sleep mode) after a predetermined period of inactivity on the LCD display 302.

The MFP 100 and the server 200 resume normal operation (normal operating mode) from power saving mode by receiving operation information from the notification processor 303 of the operation display apparatus 300.

However, the MFP 100 and the server 200 are not always both operating in power saving mode at the same time. For example, the user may manipulate the LCD monitor 302 to use either one of the MFP 100 and the server 200 after the other one of them enters power saving mode. In this case, the notification processor 303 transmits operation information to the MFP 100 through the first input-output interface 12 and to the server 200 through the second input-output interface 22. Receiving operation information, the either one of the MFP 100 and the server 200, which is operating in power saving mode, will be uselessly restored to normal operating mode, only to waste the feature of lower power consumption.

To solve this problem, in this embodiment, it is preferred that the notification processor 303 prohibit the transmission of operation information to the either one of the MFP 100 and the server 20, which is operating in power saving mode.

FIG. 6 is a view for reference in describing how to prohibit the transmission of operation information when at least either one of the MFP 100 and the server 200 is operating in power saving mode.

According to the conditions with circled number 1, the MFP 100 and the server 200 are both operating in normal operating mode. Under the conditions, the notification processor 303 does not prohibit the transmission of operation information to the MFP 100 or to the server 200. When the MFP 100 enters power saving mode, the conditions will change as described below.

According to the conditions with circled number 2, the MFP 100 is operating in power saving mode and the server 200 is operating in normal operating mode. To prevent from uselessly restoring the MFP 100 to normal from power saving mode, the notification processor 303 prohibits the transmission of operation information to the MFP 100 such that only the server 200 will receive it.

When the server 200 also enters power saving mode as well as the MFP 100, the conditions will change again. According to the conditions with circled number 3, the MFP 100 and the server 200 are both operating in power saving mode. Under the conditions, the display processor 301 causes the LCD monitor 302 to go blank to save power.

Under the conditions, the notification processor 303 may prohibit the transmission of operation information to the MFP 100 and to the server 200. However, it should be noted that, in this embodiment, the server 200 is provided as a primary apparatus and the MFP 100 is provided as a secondary apparatus, which means that the MFP 100, a secondary apparatus that behaves as if it is one of the multiple functions of the server 200, is configured to change the operating mode in conjunction with the server 200. So, it is preferred that the notification processor 303 prohibit the transmission of operation information to the MFP 100 but not prohibit the transmission of operation information to the server 200.

When the server 200 resumes normal operation from power saving mode, the conditions will change again.

In this embodiment, the MFP 100 resumes normal operation from power saving mode in conjunction with the server 200. According to the conditions with circled number 4, the MFP 100 and the server 200 are both operating in normal operating mode as they are under the conditions with circled number 1. Under the conditions, the notification processor 303 does not prohibit the transmission of operation information to the MFP 100 or to the server 200.

When the server 200 enters power saving mode, the conditions will change again. According to the conditions with circled number 5, the MFP 100 is operating in normal operating mode. Under the conditions, the notification processor 303 does not prohibit the transmission of operation information to the MFP 100. Alternatively, the notification processor 303 may prohibit the transmission of operation information to the MFP 100 regardless of whether or not the MFP 100 is operating in power saving mode, when the server 200 enters power saving mode. In this case, the notification processor 303 does not prohibit the transmission of operation information to the server 200.

When the server 200 receives operation information and thereby resumes normal operation from power saving mode, the conditions will change again. According to the conditions with circled number 6, the MFP 100 and the server 200 are both operating in normal operating mode as they are under the conditions with circled number 1. Under the conditions, the notification processor 303 does not prohibit the transmission of operation information to the MFP 100 or to the server 200.

In this embodiment described above, when the MFP 100 enters power saving mode, the notification processor 303 prohibits the transmission of operation information to the MFP 100. So, the MFP 100 cannot resume normal operation from power saving mode even when the user touches the touch screen panel 304 to use a function of the MFP 100; and the user cannot use the MFP 100 accordingly.

To solve this problem, in this embodiment, it is preferred that the notification processor 303 not prohibit the transmission of operation information to the MFP 100 if the screen detector 301b judges that an operation screen of the MFP 100 such as the operation screen shown in FIG. 5 is displayed on the LCD monitor 302 when the MFP 100 enters power saving mode. This situation occurs when the MFP 100 enters power saving mode after a certain period of inactivity on the operation screen of the MFP 100. Receiving operation information, the MFP 100 will resume normal operation from power saving mode; and the user will be able to use the MFP 100 accordingly.

It is also preferred that the notification processor 303 remove the prohibition on the transmission of operation information to the MFP 100 if the screen detector 301b judges that an operation screen of the server 200 such as the operation screen shown in FIG. 4 is displayed on the LCD monitor 302 and that any function button of the function button group 110 on the operation screen is touched by the user, when the MFP 100 enters power saving mode. Receiving operation information, The MFP 100 will resume normal operation from power saving mode. Since it is obvious that the user touches a function button of the function button group 110 with intent to use the MFP 100, restoring the MFP 100 to normal from power saving mode will contribute to the usability.

The function button group 110, which is mentioned above, serves as a restoration area for restoring the MFP 100 to normal from power saving mode. Instead of the function button group 110, an operation button that serves as a restoration component for restoring the MFP 100 to normal from power saving mode may be displayed on the operation screen of the server 200. In this case, the notification processor 303 removes the prohibition on the transmission of operation information to the MFP 100 upon the pressing of this operation button. Receiving operation information, the MFP 100 will resume normal operation from power saving mode.

In this embodiment, the notification processor 303 removes the prohibition on the transmission of operation information to the MFP 100 when the user touches a restoration area on the touch screen panel 304. Alternatively, the notification processor 303 may remove the prohibition on the transmission of operation information to the MFP 100 when the user presses a certain hardware key of the hardware keyboard 305 or when the sensor 306 detects an activity.

Figures 7, 8:
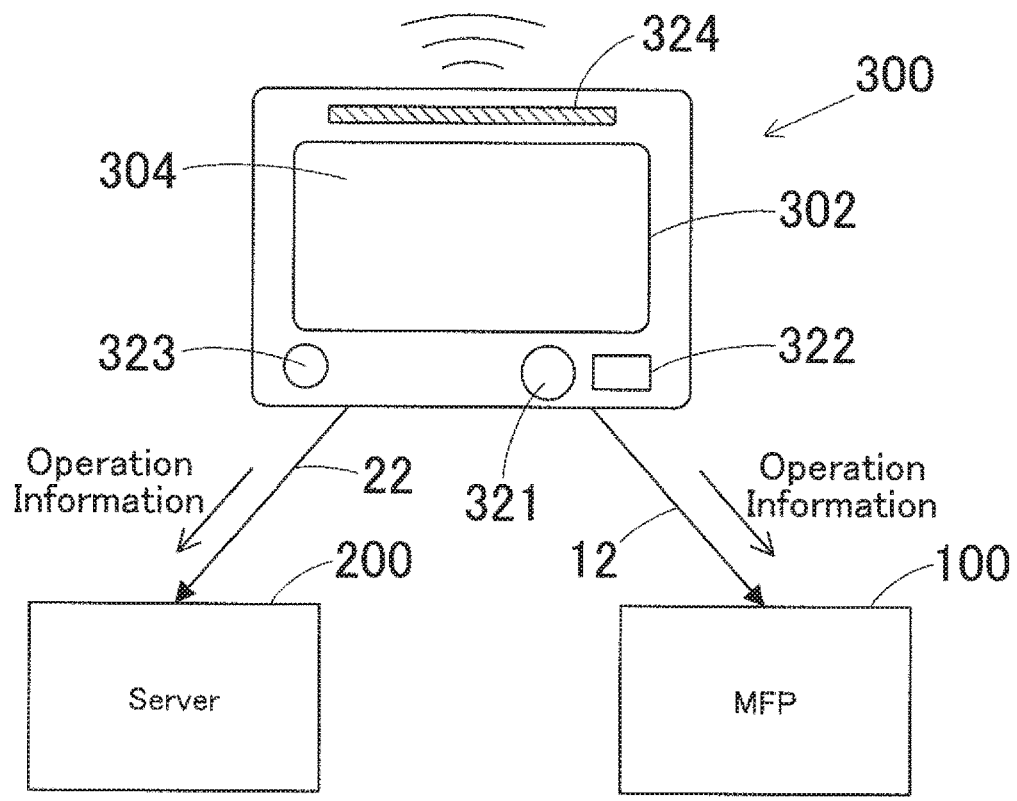
FIG. 7 illustrates an operation display apparatus provided with hardware keys and other components for removing the prohibition on the transmission of operation information.
FIG. 8 is a table showing that the hardware keys and other components for removing the prohibition on the transmission of operation information are assigned to the first or second apparatus.

For example, the operation display apparatus 300 is provided with hardware keys 321, 322, and 323 and a sensor (e.g. a proximity sensor) 324, as illustrated in FIG. 7. FIG. 8 is a table showing that the hardware keys 321, 322, and 323 and the sensor 324 are assigned in advance to the MFP 100 or the server 200. When any of the hardware keys 321, 322, and 323 is pressed or when the sensor 324 detects an activity, the notification processor 303 removes the prohibition on the transmission of operation information to the MFP 100 or the server 200 in accordance with the assignment. Receiving operation information, the MFP 100 or the server 200 will resume normal operation from power saving mode.

According to the table of FIG. 8, in this example, the hardware keys 321 and 322 and the sensor 324 are assigned to the MFP 100. When the hardware key 321 or 322 is pressed or when the sensor 324 detects an activity, the notification processor 303 removes the prohibition on the transmission of operation information to the MFP 100. Meanwhile, the hardware key 323 is assigned to the server 200. When the user presses the hardware key 323, the notification processor 303 removes the prohibition on the transmission of operation information to the server 200. Receiving operation information, the server 200 will resume normal operation from power saving mode.

According to the table of FIG. 8, the touch screen panel 304 is assigned to both of the MFP 100 and the server 200. Technically, the touch screen panel 304 is assigned to the MFP 100 or the server 200 depending on the screen displayed on the LCD monitor 302.

In this embodiment, the notification processor 303 performs operation as described below, for example. As referred to in FIG. 9, a switch 40, which is capable of opening and closing a path, is provided in the path originating from the notification processor 303 and leading to the MFP 100 through the first input-output interface 12. The notification processor 303 prohibits the transmission of operation information to the MFP 100 by opening the switch 40 and removes the prohibition on the transmission by closing the switch 40.

Figure 9:
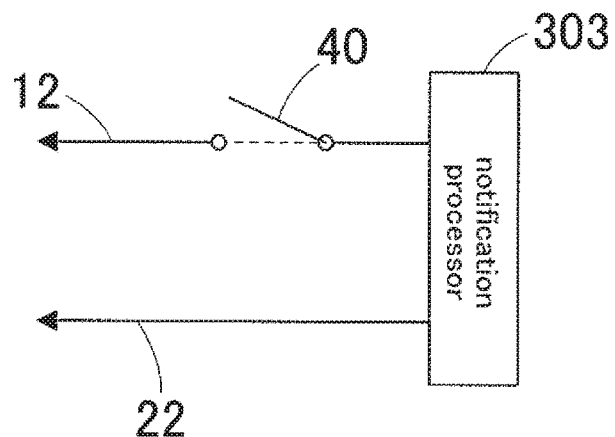
FIG. 9 is a view for reference in describing an implementation example in which a notification processor prohibits the transmission of operation information.

In the example of FIG. 9, the switch 40 is provided only in the path originating from the notification processor 303 and leading to the MFP 100 through the first input-output interface 12. If it is necessary to prohibit the transmission to the server 200, another switch 40 may be provided in the path originating from the notification processor 303 and leading to the server 200 through the second input-output interface 22. In this case, the notification processor 303 prohibits the transmission of operation information to the server 200 by opening the switch 40 and removes the prohibition on the transmission by closing the switch 40.

Figure 10:
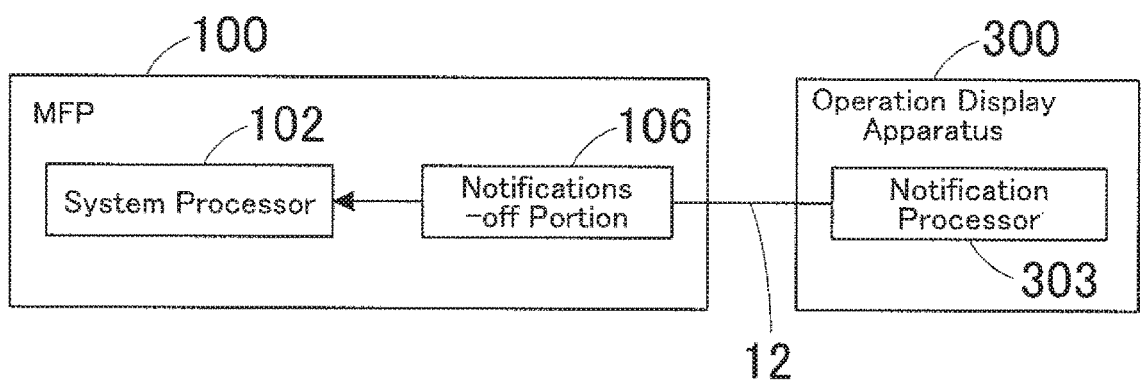
FIG. 10 is a view for reference in describing another example in which the notification processor prohibits the transmission of operation information.

FIG. 10 shows another example for the notification processor 303 to prohibit the transmission of operation information to the MFP 100. In the example of FIG. 10, a notifications-off portion 106, which is capable of disabling the transmission of operation information from the notification processor 303 and disturbing the input to the system processor 102, is provided in the path originating from the notification processor 303 and leading to the MFP 100, at a position upstream of the system processor 102. To remove the prohibition on the transmission, the notification processor 303 enables the input to the system processor 102 by turning off the notifications-off portion 106. The notification processor 303 disables and enables the input through the first input-output interface 12 by turning on and off the notifications-off portion 106.

Similarly, if it is necessary to prohibit the transmission to the server 200, a notifications-off portion, which is capable of disabling the input to the system processor 202, may be provided in the path originating from the notification processor 303 and leading to the server 200, at a position upstream of the system processor 202.

The MFP 100 may supply power to the notifications-off portion 106; in this case, the MFP 100 must be configured to supply power to the notifications-off portion 106 continuously even after the MFP 100 enters power saving mode.

Figure 11:
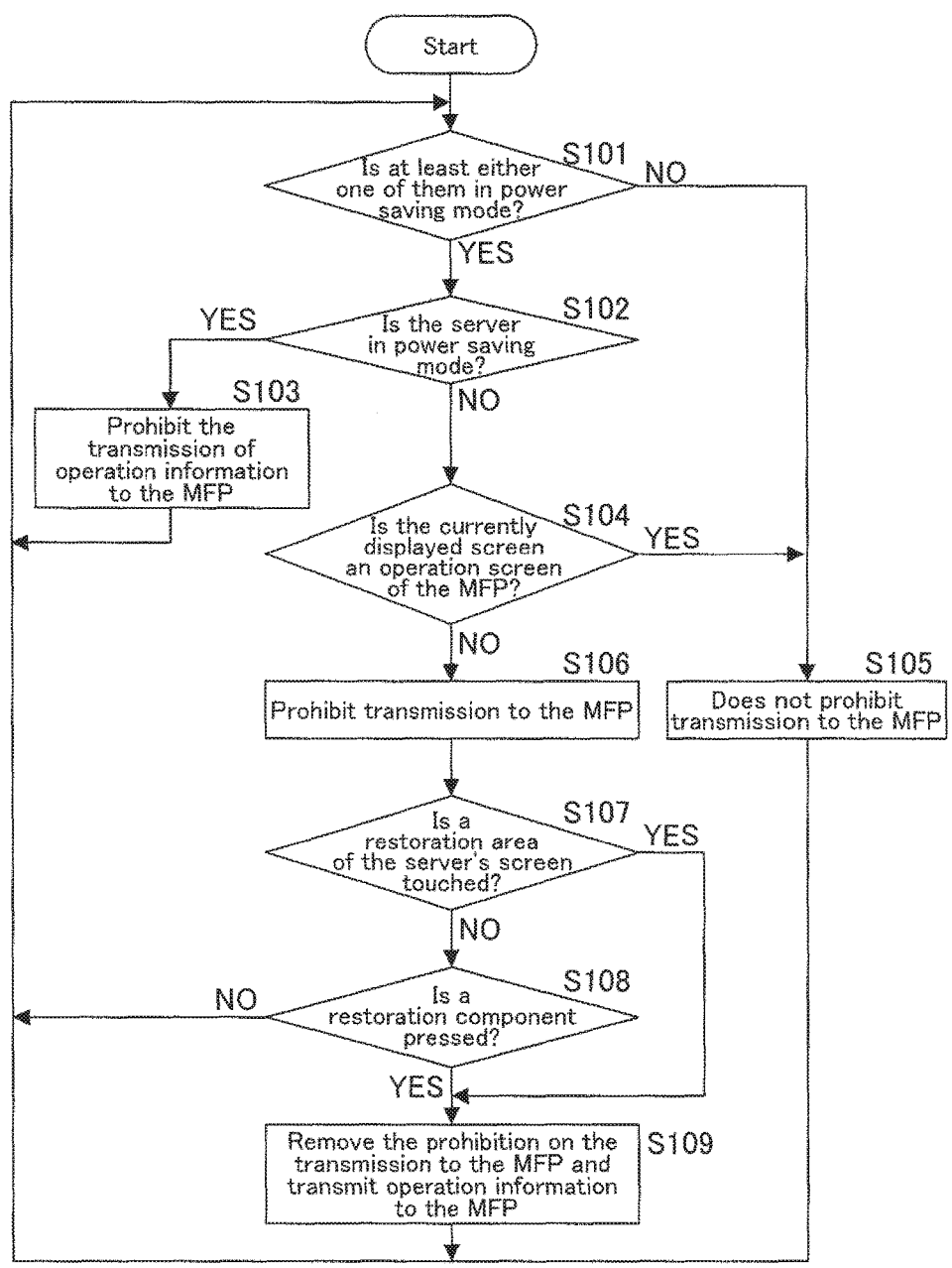
FIG. 11 is a flowchart representing operations of the operation display apparatus.

FIG. 11 is a flowchart representing operations of the notification processor 303 of the operation display apparatus 300 of the information apparatus 10. The flowchart is executed by the CPU 311 of the operation display apparatus 300 in accordance with an operation program stored on a recording medium such as the ROM 312.

In Step S101, it is judged whether or not at least either one of the MFP 100 and the server 200 is operating in power saving mode. If neither one of them is operating in power saving mode (NO in Step S101), the notification processor 303 does not prohibit the transmission of operation information to the MFP 100 in Step S105. The routine then returns to Step S101.

If at least either one of the MFP 100 and the server 200 is operating in power saving mode (YES in Step S101), it is further judged in Step S102 whether or not the server 200 is operating in power saving mode. If the server 200 is operating in power saving mode (YES in Step S102), the routine proceeds to Step S103 in which the notification processor 303 prohibits the transmission of operation information to the MFP 100, a secondary apparatus to the server 200, regardless of whether or not the MFP 100 is operating in power saving mode. The routine then returns to Step S101.

If the server 200 is not operating in power saving mode (NO in Step S102), the MFP 100 must be operating in power saving mode. So, it is judged in Step S104 whether or not the screen displayed on the LCD monitor 302 is an operation screen of the MFP 100. If it is an operation screen of the MFP 100 (YES in Step S104), the notification processor 303 does not prohibit the transmission of operation information to the MFP 100 in Step S105. The routine then returns to Step S101.

In Step S104, if the screen displayed on the LCD monitor 302 is not an operation of the MFP 100 (NO in Step S104), the notification processor 303 prohibits the transmission of operation information to the MFP 100 in Step S106.

In Step S107, it is judged whether or not a restoration area of the display area of the operation screen of the server 200, which is displayed on the LCD monitor 302, is touched. If a restoration area is touched (YES in Step S107), the routine proceeds to Step S109. If a restoration area is not touched (NO in Step S107), the routine proceeds to Step S108, in which it is judged whether or not a restoration component such as the hardware keys 321 and 322 is pressed or whether or not the sensor 324 detects an activity. If a restoration component is pressed or if the sensor 324 detects an activity (YES in Step S108), the routine proceeds to Step S109. If a restoration component is not pressed or if the sensor 324 detects an activity (NO in Step S108), the routine returns to Step S101. This means, the notification processor 303 will continuously prohibit the transmission of operation information to the MFP 100.

In Step S109, the notification processor 303 removes the prohibition on the transmission and transmits operation information to the MFP 100. The routine then returns to Step S101. Receiving operation information, the MFP 100 will resume normal operation from power saving mode.

While one embodiment of the present invention has been described in details herein it should be understood that the present invention is not limited to the foregoing embodiment. For example, the first and second apparatus constituting the information apparatus 10 may be other apparatuses than the MFP 100 or the server 200. For another example, three or more apparatuses may constitute the information apparatus 10; in this case, the one operation display apparatus 300 is for shared use among these apparatuses.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An operation display apparatus for shared use between a first apparatus and a second apparatus each being capable of operating independently, the operation display apparatus comprising:

a display;

a manipulation device; and a processor which performs operations comprising:

controlling the display to selectively show display data received from the first apparatus through a first display interface and display data received from the second apparatus through a second display interface;

transmitting operation information of an operation input to the manipulation device to the first apparatus through a first input-output interface and to the second apparatus through a second input-output interface;

detecting, through the second display interface, whether the second apparatus enters a power saving mode; and prohibiting the transmission of the operation information to the second apparatus through the second input-output interface when it is detected that the second apparatus enters the power saving mode.

2. The operation display apparatus according to claim 1, wherein:
the first apparatus is a server as a primary apparatus and the second apparatus is an image processing apparatus as a secondary apparatus; and
the processor prohibits the transmission of the operation information to the image processing apparatus when it is detected that the image processing apparatus enters the power saving mode.

3. The operation display apparatus according to claim 2, wherein the processor further performs operations comprising:
judging whether or not the display data shown on the display is an operation screen of the image processing apparatus; and
not prohibiting the transmission of the operation information to the image processing apparatus if the processor judges that the display data shown on the display is an operation screen of the image processing apparatus when it is detected that the image processing apparatus enters the power saving mode.

4. The operation display apparatus according to claim 1, wherein:
the processor further performs an operation of detecting, through the first display interface, whether the first apparatus enters a power saving mode;
the first apparatus is a server as a primary apparatus and the second apparatus is an image processing apparatus as a secondary apparatus; and
the processor prohibits the transmission of the operation information to the image processing apparatus regardless of whether or not the image processing apparatus is operating in the power saving mode, when it is detected that the server enters the power saving mode.

5. The operation display apparatus according to claim 1, wherein:
the first apparatus is a server and the second apparatus is an image processing apparatus;
the display data shown on the display is an operation screen of the server, and a display area of the operation screen includes a restoration area for restoring the image processing apparatus to a normal operating mode from the power saving mode; and
the processor removes the prohibition on the transmission of the operation information to the image processing apparatus when the restoration area is touched via the manipulation device after the image processing apparatus enters the power saving mode.

6. The operation display apparatus according to claim 1, wherein:
the first apparatus is a server and the second apparatus is an image processing apparatus;
the manipulation device includes a restoration component for restoring the image processing apparatus to a normal operating mode from the power saving mode; and
the processor removes the prohibition on the transmission of the operation information to the image processing apparatus when the restoration component is pressed after the image processing apparatus enters the power saving mode.

7. The operation display apparatus according to claim 1, wherein:

the first apparatus is a server and the second apparatus is an image processing apparatus;
the operation display apparatus further comprises a sensor for restoring the image processing apparatus to a normal operating mode from the power saving mode; and
the processor removes the prohibition on the transmission of the operation information to the image processing apparatus when the sensor detects an activity after the image processing apparatus enters the power saving mode.

8. The operation display apparatus according to claim 1, wherein the processor detects that the second apparatus enters the power saving mode by detecting a change of a power saving signal from the second display interface.

9. The operation display apparatus according to claim 1, wherein the processor detects that the second apparatus enters the power saving mode by losing a display clock signal from the second display interface.

10. The operation display apparatus according to claim 1, wherein the processor detects that the second apparatus enters the power saving mode by detecting an off state of an illumination signal from the second display interface.

11. The operation display apparatus according to claim 1, wherein:
the processor is capable of selectively opening and closing a first path and a second path both originating from the manipulation device, the first path leading to the first apparatus through the first input-output interface, and the second path leading to the second apparatus through the second input-output interface; and
the processor prohibits the transmission of the operation information to the second apparatus by opening the second path.

12. The operation display apparatus according to claim 1, wherein the processor prohibits the transmission of the operation information to the second apparatus by disabling the operation information and disturbing the input thereof through the second input-output interface to the second apparatus.

13. An information apparatus comprising:
a first apparatus and a second apparatus each being capable of operating independently; and
the operation display apparatus according to claim 1.

14. A non-transitory computer-readable recording medium storing a program for an operation display apparatus, the operation display apparatus comprising a display and a manipulation device, use of the operation display apparatus being shared between a first apparatus and a second apparatus each of which is capable of operating independently, and the program controlling a computer of the operation display apparatus to perform operations comprising:
controlling the display to selectively show display data received from the first apparatus through a first display interface and display data received from the second apparatus through a second display interface;
transmitting operation information of an operation input to the manipulation device to the first apparatus through a first input-output interface and to the second apparatus through a second input-output interface;
detecting, through the second display interface, whether the second apparatus enters a power saving mode; and
prohibiting the transmission of the operation information to the second apparatus through the second input-output interface when it is detected that the second apparatus enters the power saving mode.

15. The non-transitory computer-readable recording medium according to claim 14, wherein:
the first apparatus is a server as a primary apparatus and the second apparatus is an image processing apparatus as a secondary apparatus; and
the program controls the computer to prohibit the transmission of the operation information to the image processing apparatus when it is detected that the image processing apparatus enters the power saving mode.

16. The non-transitory computer-readable recording medium according to claim 15, the program controlling the computer to further perform operations comprising:
judging whether or not the display data shown on the display is an operation screen of the image processing apparatus; and
not prohibiting the transmission of the operation information to the image processing apparatus if it is judged that the display data shown on the display is an operation screen of the image processing apparatus when it is detected that the image processing apparatus enters the power saving mode.

17. The non-transitory computer-readable recording medium according to claim 14, wherein the first apparatus is a server as a primary apparatus and the second apparatus is an image processing apparatus as a secondary apparatus, and wherein the program controls the computer to further perform operations comprising:
detecting, through the first display interface, whether the server enters a power saving mode; and
prohibiting the transmission of the operation information to the image processing apparatus regardless of whether or not the image processing apparatus is operating in the power saving mode, when it is detected that the server enters the power saving mode.

18. The non-transitory computer-readable recording medium according to claim 14, wherein:
the first apparatus is a server and the second apparatus is an image processing apparatus;
the display data shown on the display is an operation screen of the server, and a display area of the operation screen includes a restoration area for restoring the image processing apparatus to a normal operating mode from the power saving mode; and
the program controls the computer to remove the prohibition on the transmission of the operation information to the image processing apparatus when the restoration area is touched via the manipulation device after the image processing apparatus enters the power saving mode.

19. The non-transitory computer-readable recording medium according to claim 14, wherein:
the first apparatus is a server and the second apparatus is an image processing apparatus;
the manipulation device includes a restoration component for restoring the image processing apparatus to a normal operating mode from the power saving mode; and
the program controls the computer to remove the prohibition on the transmission of the operation information to the image processing apparatus when the restoration component is pressed after the image processing apparatus enters the power saving mode.

20. The non-transitory computer-readable recording medium according to claim 14, wherein:
the first apparatus is a server and the second apparatus is an image processing apparatus;
the operation display apparatus further comprises a sensor for restoring the image processing apparatus to a normal operating mode from the power saving mode; and
the program controls the computer to remove the prohibition on the transmission of the operation information to the image processing apparatus when the sensor detects an activity after the image processing apparatus enters the power saving mode.

21. The non-transitory computer-readable recording medium according to claim 14, the program controlling the computer to detect that the second apparatus enters the power saving mode by detecting a change of a power saving signal from the second display interface.

22. The non-transitory computer-readable recording medium according to claim 14, the program controlling the computer to detect that the second apparatus enters the power saving mode by losing a display clock signal from the second display interface.

23. The non-transitory computer-readable recording medium according to claim 14, the program controlling the computer to detect that the second apparatus enters the power saving mode by detecting an off state of an illumination signal from the second display interface.

24. The non-transitory computer-readable recording medium according to claim 14, the program controlling the computer to selectively open and close a first path and a second path both originating from the manipulation device, the first path leading to the first apparatus through the first input-output interface, the second path leading to the second apparatus through the second input-output interface, and the program controlling the computer to prohibit the transmission of the operation information to the second apparatus by opening the second path.

25. The non-transitory computer-readable recording medium according to claim 14, the program controlling the computer to prohibit the transmission of the operation information to the second apparatus by disabling the operation information and disturbing the input thereof through the second input-output interface to the second apparatus.

* * * * *